(12) United States Patent
Seymour (10) Patent No.: US 12,415,426 B2
(45) Date of Patent: Sep. 16, 2025

(54) SAFETY SYSTEM FOR A BAGGAGE TRACTOR

(71) Applicant: Hi Performance Electric Vehicle Systems, Inc., Ontario, CA (US)

(72) Inventor: Brian Seymour, Ontario, CA (US)

(73) Assignee: Hi Performance Electric Vehicle Systems, Inc., Ontario, CA (US)

( * ) Notice: Subject to any disclaimer, the term of this patent is extended or adjusted under 35 U.S.C. 154(b) by 792 days.

(21) Appl. No.: 17/566,567

(22) Filed: Dec. 30, 2021

(65) Prior Publication Data

US 2023/0010344 A1    Jan. 12, 2023

Related U.S. Application Data

(60) Provisional application No. 63/218,800, filed on Jul. 6, 2021.

(51) Int. Cl.
| | | |
|---|---|---|
| B60L 15/20 | (2006.01) | |
| B60W 30/02 | (2012.01) | |
| B60W 30/18 | (2012.01) | |

(52) U.S. Cl.
CPC .......... B60L 15/20 (2013.01); B60L 15/2045 (2013.01); B60W 30/02 (2013.01); B60W 30/18145 (2013.01); B60W 2540/18 (2013.01); B60Y 2200/91 (2013.01)

(58) Field of Classification Search
CPC ..... B60L 15/20; B60L 15/2045; B60W 30/02; B60W 30/18145; B60W 2540/18; B60Y 2200/91
USPC .......................................................... 701/22
See application file for complete search history.

(56) References Cited

U.S. PATENT DOCUMENTS

| | | | |
|---|---|---|---|
| 7,116,065 B2 | 10/2006 | Wakitani et al. | |
| 8,548,722 B2 * | 10/2013 | Puhalla | B60W 40/112 701/124 |
| 9,764,734 B1 * | 9/2017 | Brown | B60W 30/143 |
| 10,392,007 B1 * | 8/2019 | Brown | B60W 30/04 |
| 10,906,406 B1 | 2/2021 | Healy | |
| 11,049,336 B1 * | 6/2021 | Mendes | B60R 25/25 |
| 2010/0082191 A1 | 4/2010 | Seo et al. | |

(Continued)

FOREIGN PATENT DOCUMENTS

| | | | |
|---|---|---|---|
| CN | 105882773 A | * | 8/2016 |
| DE | 102017101367 A1 | | 6/2018 |

(Continued)

OTHER PUBLICATIONS

Morfopoulos, S. (May 26, 2020). G-force and potential damage to shipments. Impact. https://impactograph.com/g-force/ (Year: 2020).*
Dedík, M., Hrudkay, K., & Sperka, A. (2021). The Use of Progressive Gravitational Methods in the Logistics of Rail Passenger Transport. Acta Logistica, 8(1), 19-25. doi:https://doi.org/10.22306/al.v8i1.198 (Year: 2021).*

(Continued)

*Primary Examiner* — Ramya P Burgess
*Assistant Examiner* — Keith A von Volkenburg
(74) *Attorney, Agent, or Firm* — Ruggiero McAllister & McMahon LLC (57) ABSTRACT

A safety system for a baggage tractor is provided that addresses the problems associated with tipping over or flipping of vehicles due to excessive speed around turns. Additionally, the safety system for a baggage tractor is provided that is fully integrated to ease replacement of a combustion engine in a baggage tractors with an electric motor and automated safety control system.

22 Claims, 6 Drawing Sheets

(56) References Cited

U.S. PATENT DOCUMENTS

| | | | | |
|---|---|---|---|---|
| 2013/0204475 | A1* | 8/2013 | Brandenstein | B60L 15/20 701/22 |
| 2014/0214299 | A1* | 7/2014 | Risse | B60T 17/221 701/1 |
| 2016/0037708 | A1* | 2/2016 | Johnson | A01B 79/005 701/70 |
| 2017/0072815 | A1* | 3/2017 | Cho | B60W 30/18027 |
| 2017/0372431 | A1* | 12/2017 | Perl | G06Q 10/047 |
| 2018/0118174 | A1* | 5/2018 | Moskowitz | B60L 50/66 |
| 2020/0216066 | A1* | 7/2020 | Aggoune | B60W 40/02 |
| 2020/0216067 | A1* | 7/2020 | Olin | B60W 20/15 |
| 2021/0009138 | A1* | 1/2021 | Janampally | B60W 40/06 |
| 2021/0017719 | A1* | 1/2021 | Jamtgaard | E01D 2/00 |
| 2021/0086577 | A1* | 3/2021 | Fischer | B62J 17/08 |

FOREIGN PATENT DOCUMENTS

| | | | |
|---|---|---|---|
| EP | 2374692 | A2 | 10/2011 |
| EP | 2508403 | A1 | 10/2012 |
| EP | 2965939 | A1 | 1/2016 |
| JP | 2020020665 | B2 | 2/2020 |

OTHER PUBLICATIONS

Morfopoulos,S.(May 26, 2020).G-forceandpotentialdamagetoshipments. Impact.httos://impactograph.com/g-force/(Year:2020) (Year: 2020).*

Dedik,M.,Hrudkay,K.,&Sperka,A.(2021).THEUSEOFPROGRESSIVEGRAVITATIONALMETHODSINTHELOGISTICSOFRAILPASSENGERTRANSPORT.ActaLogistica,8(1),19-25.doi:https://doi.org/10.22306/al.v8i1.198(Year:2021) (Year: 2021).*

Today's News; "2 young part-time UPS workers killed in California"; Industrial Safety & Hygiene News; Dec. 2, 2019.

Jungheinrich; "8,800/11,000 lb. Capacity Electric Tow Tractor"; Mitsubishi Logisnext Americas Inc.; copyright 2020; downloaded from internet Dec. 30, 2021; https://www.logisnextamericas.com/en/jungheinrich/forklifts-pallet-trucks/jungheinrich/classiii/tow-tractors/ezs-350na-c40na.

Linde "The Linde Tractor Range. 2 to 25 tonnes"; Linde Material Handling GmbH; downloaded from internet Dec. 30, 2021; https://www.linde-mh.com/media/Brochures/EN_p_2_25t_tractor_range_en_d_0716.pdf.

OSHA; "Preventing Vehicle Accidents and Collisions"; Airline Ground Safety Panel; Alliance an OSHA Cooperative Program; Jan. 2013.

* cited by examiner

SAFETY SYSTEM FOR A BAGGAGE TRACTOR

FIELD OF THE INVENTION

The invention relates to an electric vehicle system that is fully integrated and designed to be installed or retrofitted in baggage tractors used to pull luggage trailers. More particularly, the invention relates to a safety system for airport baggage tractors that prevents the tractor from tipping over by automatically reducing the speed of the tractor when certain conditions are met.

BACKGROUND OF THE INVENTION

With the increase in global concern over the effects of combustion engines on air and atmosphere quality, there has been a shift in focus to powering vehicles via renewable energy sources. Baggage tractors are widely in use at airports and historically have used gasoline or diesel powered their engines. There has been an effort in the industry to replace the "old" combustion engine tractors with "new" electric powered tractors. While electricity is not a "renewable" energy source in and of itself, it can be generated via renewable sources. However, baggage tractors are very expensive and have a long lifespan. It is prohibitively expensive to simply replace existing combustion engine powered baggage tractors with new or used electric-powered baggage tractors. Additionally, the destruction of many baggage tractors that could continue to function for many more years, while not financially advisable, would also have an impact on the environment.

In view of the above, there is a need to for a system that can replace an existing combustion drive system quickly and affordably with an electric drive system thereby allowing for the tractor to stay in service for many additional years.

Baggage tractors often weigh upwards of 5,000-lbs and may pull more than 10,000-lbs of luggage to and from an aircraft. In addition to their immense weight, these vehicles have a relatively narrow wheelbase and are quite long, measuring around 4-ft in width and 8-ft in length. Additionally, baggage tractors have a relatively high center of gravity which allows a driver to have a clear view of their surroundings. The substantial weight paired with the narrow wheelbase of the vehicle and the high center of gravity puts the vehicle at increased risk of overturning when the vehicle is turned at higher speeds. The risk of a tractor overturning is further heightened risk when seasonal workers with little experience are used during periods of high activity at airports. Lack of experience or youth is known to contribute to dangerous operation of these vehicles.

One incident occurred in 2019 as reported in the Industrial Safety & Hygiene News (ISHN) where two young part-time airport workers were killed due to the overturning of a luggage tractor. https://www.ishn.com/articles/111906-young-part-time-ups-workers-killed-in-california. It is highly likely that turning the vehicle at a relatively high speed was a factor in the accident. In view of the dangers associated with baggage tractors overturning, there is a need to ensure that these vehicles cannot be operated in a manner that will allow them to overturn.

The Airline Ground Safety Panel ("AGSP"), in a cooperative program with the Occupational Safety and Health Administration ("OSHA"), has published resources for Airport Ground Support personnel regarding prevention of accidents and collisions for baggage tractors. Regarding the overturning of baggage tractors, these resources recommend that "[t]o prevent carts from tipping, [operators should] slow down to appropriate speeds when driving around corners and avoid sharp or abrupt turns." Preventing Accidents and Collisions Fact Sheet, Airlines Ground Safety Alliance. https://www.oshaagspa.org/preventing-accidents-and-collisions-fact-sheet-8/.

While these guidelines are well-advised, and acted upon by many, accidents can still occur due to human error and bad decision-making. Sometimes the issue is not forgetfulness but rather misjudging an appropriate speed into a turn. This issue can be somewhat magnified by the relative youth and inexperience of new or part-time workers.

Various systems have tried to deal with this issue over the years with mixed results. For example, European Patent No. EP 2965939 A1 (the '939 patent), is directed to a system for use with an industrial truck with a battery-powered drive that attempts to avoid the occurrence of critical situations in operation. In particular, the '939 patent discloses "an acceleration sensor . . . provided as [an] inclination sensor." The '939 patent teaches that "[t]he battery 20 is formed with an inclination sensor 24, which can also serve as an acceleration sensor." However, despite generally disclosing an acceleration sensor, the '939 patent only teaches the use of inclination values from the sensor. For example, the '939 patent states, "[t]he inclination values of the battery are applied to the battery control 22 via the inclination sensor 24. The inclination values are forwarded via the battery control 22 to the vehicle control 16, where they can be processed accordingly." Thus, the '939 patent is focused on cutting the power to the motor when the vehicle starts to tip beyond a certain point. For example, the '939 patent states "[w]hen processing the inclination values recorded in the battery, the comparison with a first critical inclination value should be emphasized in particular." This focus on inclination data may be because the commercial implementation of the system is directed to forklift applications where the inclination of the vehicle, even at a very slow speed, is a critical factor. However, with a baggage tractor, if the inclination sensor only started cutting power to the vehicle when the baggage tractor tipped beyond "a first critical inclination value", this would not be optimal because the baggage tractor could be running at a high speed and could tip very quickly if turned at high speed. In other words, this system while effective for use with forklifts, would not function as well for baggage tractors that are not prone to overturn at low speeds like a forklift with a heavy load.

Of further note is that the '939 patent fails to teach or disclose a speed sensor which is important in a baggage tractor application (as opposed to a forklift application) or multiple threshold measurement values where the motor controller would reduce the power transmitted to the electric motor proportional to a measured value within a range between the multiple threshold measurement values.

Another system is disclosed in European Pat. No. EP 2508403 A1 (the '403 patent), which is directed towards a method for controlling the travel speed of an industrial truck when the steering wheel is turned. For example, the '403 patent measures "target steering angle 20 and rate of change 22 of the target steering angle . . . to determine whether braking should take place . . . or whether a particularly rapid initiation of the braking by a setpoint jump Δv 'is required." However, while the '403 patent discloses inputs to a controller including speed and steering angle, it does not disclose actually measure the forces acting on the vehicle but rather derives calculated forces via a speed sensor and steering angle sensor. This again makes sense as the '403 patent appears to be focused on forklift applications where a steering angle measurement would be highly effective. Additionally, the '403 patent fails to teach multiple threshold measurement values where the motor controller would reduce the power transmitted to the electric motor proportional to a measured value within a range between the multiple threshold measurement values.

Still another system is Chinese Pat. No. CN 204354839 U (the '839 patent) is directed towards a device for automatically limiting the speed of a forklift at different turning angles. The '839 patent teaches a device "comprising a power source, a turning angle potentiometer, a speed sensor and a controller." Through the integration of these parts the system "receives the steering angle information detected by the turning angle potentiometer by the controller to determine the maximum traveling speed allowed by the forklift based on the measured steering angle and controls the traveling speed of the forklift to be within the maximum traveling speed." Again, the '839 patent like other systems discuss above, uses a speed sensor and a steering angle sensor to calculate an anticipated safe turning speed. However, this system like other estimation systems does not provide active feedback based on current loading conditions. For example, a baggage tractor can have vastly different loads under toe where the loading can impact safe driving speed. There is no ability to achieve this functionality with this type of system. Finally, the '839 patent does not disclose multiple threshold measurement values where the motor controller would reduce the power transmitted to the electric motor proportional to a measured value within a range between the multiple threshold measurement values.

Accordingly, it would be advantageous to provide a system that is easy to integrate into existing baggage tractors, and that would address the problems described above.

SUMMARY OF THE INVENTION

What is desired is a system for powering a baggage tractor where the system detects when the baggage tractor could be in danger of overturning and automatically slows the tractor accordingly.

It is further desired to provide a system for powering a baggage tractor that allows for straightforward, fully integrated replacement of a combustion-drive system with an electric-drive systems.

It is still further desired to provide a system that measures g-forces, speed, and tilt of the tractor and for use in automatically adjusting the operation of a vehicle to ensure the tractor does not overturn.

In one configuration, a system is provided that includes an electric motor that can be installed in place of a previously installed combustion engine. The electric motor is fully integrated with most wiring and major portions of the electrical side of the system. The system may further include a wiring harness, motor controller, accelerometer, throttle, pedal, battery, and brake pedal. In one configuration, the brake may comprise regenerative braking.

It is contemplated that the system may be provided with other input sensors that can provide additional information to the motor controller regarding the necessity of reduction in speed including, for example, but not limited to: a steering angle sensor, a tilt sensor, a speed sensor, and so on.

The term "baggage tractor" as used herein includes "baggage tug," "baggage cart," or any other vehicle that functions to transport airport equipment or personal belongings in and around an airport.

The term "network" as used herein includes both networks and internetworks of all kinds, including the Internet, and is not limited to any particular type of network or inter-network.

The terms "process" and "processing" as used herein each mean an action or a series of actions including, for example, but not limited to, the continuous or non-continuous, synchronous or asynchronous, routing of data, modification of data, formatting and/or conversion of data, tagging or annotation of data, measurement, comparison and/or review of data, and may or may not comprise a program.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

In one configuration, a safety system for a baggage tractor having an electric motor connected to a battery for propelling the baggage tractor is provided, the safety system comprising a motor controller connected to the electric motor via a wiring harness, and at least one sensor generating data relating to a magnitude of a g-force generated by the movement of the baggage tractor, the data transmitted from the at least one sensor to the motor controller. The safety system further comprises a processor in the motor controller, and a storage accessible by the processor, the storage having at least one threshold value saved thereon. The safety system is provided such that the processor receives the data generated by the at least one sensor and compares the data to the at least one threshold value, and when the data equals or exceeds the threshold value, the processor causes the motor controller to automatically reduce power transmitted from the battery to the electric motor to thereby cause a reduction in the speed of the baggage tractor.

In another configuration a method for safety operating a baggage tractor having an electric motor connected to a battery for propelling the baggage tractor is provided, the method comprising the steps of connecting a motor controller to the electric motor via a wiring harness, connecting at least one sensor to a processor, and generating g-force data with the at least one sensor, the magnitude of the g-force data being related to a g-force acting on the at least one sensor due to the baggage tractor turning. The method further comprises the steps of transmitting the g-force data from the at least one sensor to the processor and comparing the g-force data to a threshold value saved on a storage and accessible by the processor. The method is provided such that when the data equals or exceeds the threshold value, the motor controller automatically reduces power transmitted from the battery to the electric motor to thereby cause a reduction in the speed of the baggage tractor.

Other objects of the invention, its particular features, and advantages will become more apparent from consideration of the following drawings.

DETAILED DESCRIPTION OF THE INVENTION

Referring now to the drawings, wherein like reference numbers designate corresponding structure throughout the views. The following examples are presented to further illustrate and explain the present invention and should not be taken as limiting in any regard. Likewise, the illustrations and drawings are not provided to scale and are provided to further explain and illustrate the novel features of the invention.

Figure 1:
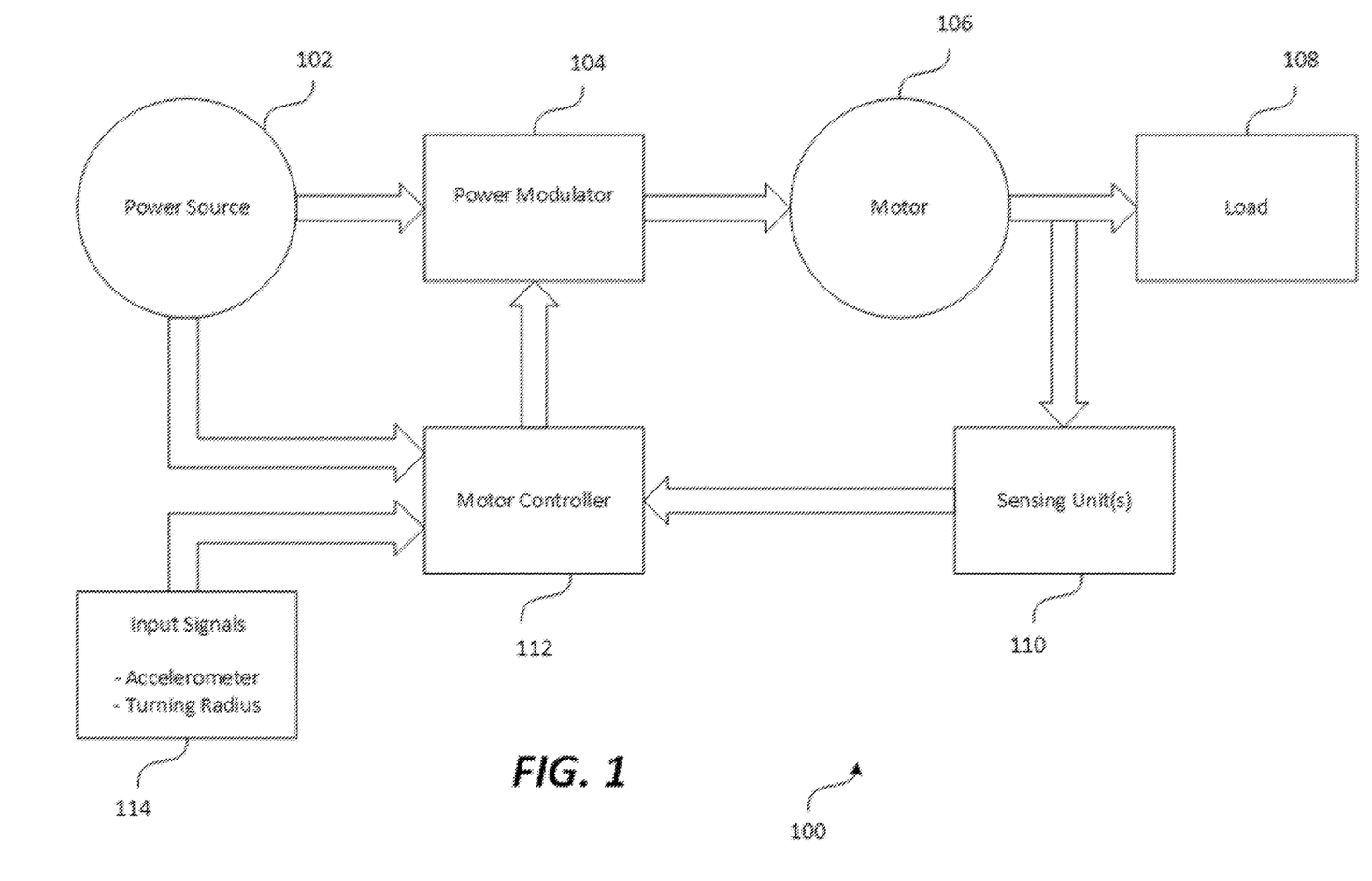
FIG. 1 is a diagram of the safety system for a baggage tractor system integrated into a vehicle.

FIG. 1. is a diagram of the safety system for a baggage tractor integrated into a vehicle safety system such as, a baggage tractor. The integrated vehicle system 100 includes a power source 102 that could comprise a lithium-ion battery, and a battery management system 104 that could also include a DC to AC power inverter. Power is transmitted from battery management system 104 to the motor 106. The motor 106 drives a load 108, in this instance, the wheels of a baggage tractor. Feedback information is read by a motor encoder feedback 110, which may comprise an encoder with a variable voltage output. Signals from the motor encoder feedback 110 are then transmitted to a motor controller 112. The motor controller 112 also accepts input signals 114 from other sources, which provide additional information for adjustment of the power transmitted from the battery management system 104 to the motor 106. The input signals 114 may include a voltage output from a sensor, such as an accelerometer (e.g., a 0-5V analog signal), but could also include an array of other types of signals from various sensors.

In one embodiment, the motor controller 112 comprises a Programmable Logic Circuit (PLC) where software is added to achieve the functionality described herein. In another configuration, it is contemplated that an accelerometer and/or an inclinometer may be provided integral with the motor controller 112.

Figure 2:
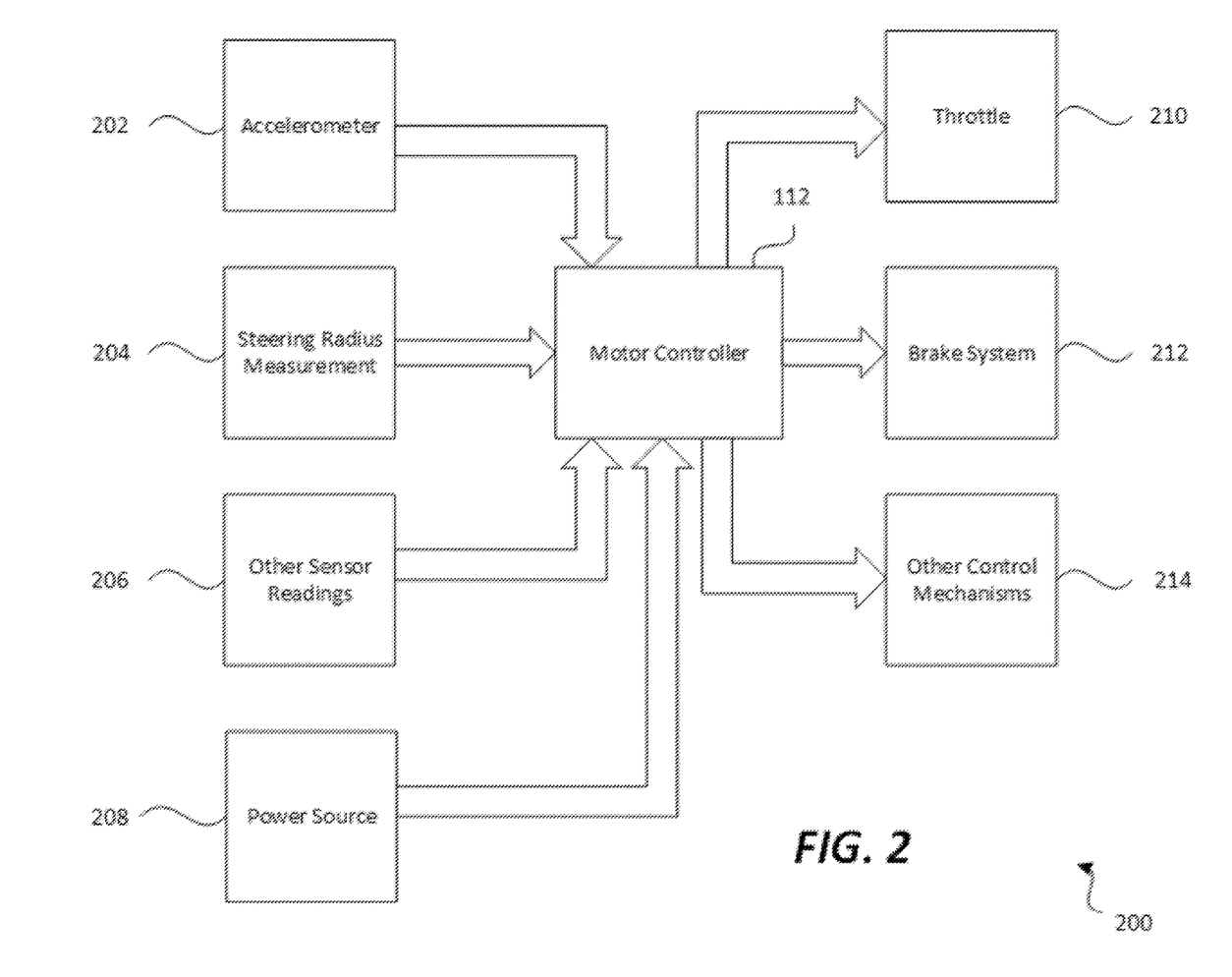
FIG. 2 is a diagram of the safety system for a baggage tractor according to FIG. 1.

Referring to FIG. 2, the safety system 200 for a baggage tractor is shown in greater detail. The motor controller 112 is provided with input signals from an accelerometer 202, measuring g-forces acting upon the baggage tractor when the vehicle turns while being propelled. The motor controller 112 is also adapted to receive additional sensor signals, such as a steering radius measurement 204 or other sensor readings 206. The other sensor readings 206 may include, for example, a tilt sensor providing information on the inclination of the baggage tractor, or a speed sensor that could measure the rotational speed of the wheels, and the like.

The motor controller is powered by a power source 208, which could comprise a DC power source such as a dedicated power supply. The motor controller 112 when comparing the various measured values (e.g., g-force, tilt, speed, etc.) may provide an altered throttle signal 210 to affect a change in speed of the vehicle. Other signals may include a braking system signal 212 that could automatically apply the brakes if the sensor inputs exceed a threshold. Additionally, the motor controller 112 may send out additional signals for interaction with other various control mechanisms 214.

Figure 3:
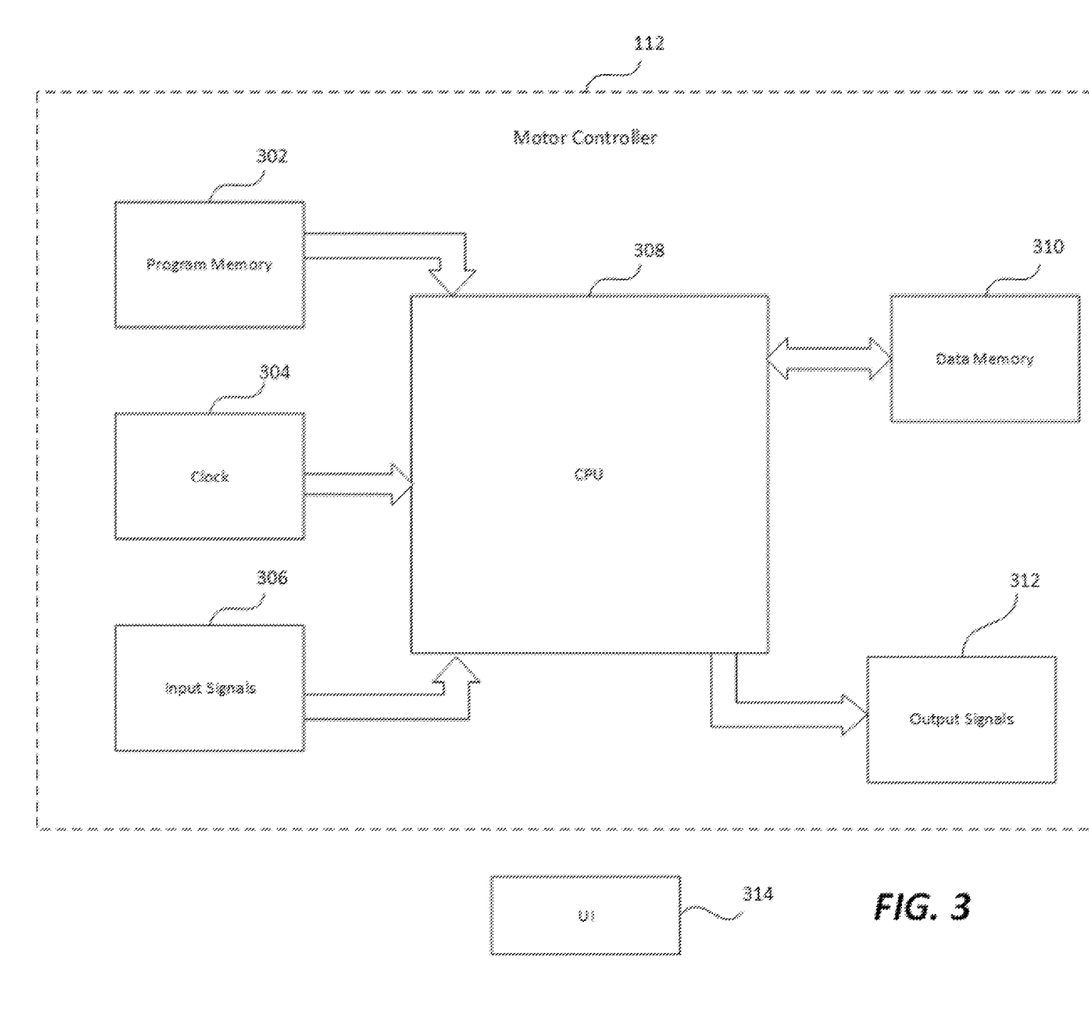
FIG. 3 is a diagram of the motor controller according to FIG. 1.

Now referring to FIG. 3, the motor controller 112 is shown in greater detail. The program memory 302 contains a looping program that, in one configuration, may only be changed through an external update. The clock 304 controls the speed at which the CPU 308 (e.g., processor) executes instructions and performs certain operations. The input signals 306 may include any or all signals coming from peripheral devices. The data memory 310 allows for temporary variables from which the CPU can read or write. The data memory may further include an array of threshold values related to various measured signals including, for example, a threshold g-force, a threshold inclination, a threshold speed and the like. It is understood that the CPU 308 may compare any of the input data from such sensors to the corresponding threshold values to alter the power being transmitted to the motor. It is further understood that the combination of measured values may impact how the motor controller 112 alters the power. For example, if the inclination of the baggage tractor is read as 6 degrees to the right had side of the baggage tractor, this may function to the lower the g-force threshold when the baggage tractor is turning to the left, but increase the threshold when the baggage tractor is turning to the right according to the programming. The same may be true of the speed sensor and any additional sensors that may be used. The output signals 312 may include any or all signals coming from the motor controller 112 to peripheral devices.

A user interface 314 is also provided such that an authorized individual can make appropriate changes to the program. It is contemplated that the various thresholds the system may check the various input signals against may be changed depending on the application. For example, for a baggage tractor that is going to be used by part time seasonal workers, the g-force threshold at which a baggage tractor may achieve prior to the system automatically cutting power to the motor may be set lower than that for baggage tractors operated by very experienced drivers. Additionally, the congestion at the facility/tarmac, or the distance the baggage tractor may need to travel to bring a load to an airplane, or the condition of the surfaces the baggage tractor may be traveling over may all be factors that can be considered in setting thresholds. It is further contemplated that weather conditions could also be considered. As such, these thresholds may be dynamically altered via a wireless connection as programmed. While it is contemplated that the user interface 314 may comprise a manual device to set the threshold values, it is contemplated that it may be desirable to have automatic wireless communication with a computer via a network connection that can automatically adjust these thresholds based on certain conditions, such as, high winds or other conditions that may impact the baggage tractor in operation. For example, it is contemplated that multiple baggage tractors at an airport could have threshold values automatically adjusted airport wide when weather conditions change including snow and ice conditions. It is further contemplated that the load the baggage tractor is towing may also be taken into consideration when setting the threshold values. While a single threshold has been described, it should be noted that each threshold associated with each type of sensor could comprise multiple thresholds as which various actions are taken, or may include a range of values within which various actions are taken from the bottom of the range to the top of the range all of which can be programmable or selectable including being automatically adjusted wirelessly.

While a CPU 308 is illustrated in FIG. 3, it is contemplated that the described above program may run on a computer, a digital signal processor, a field-programmable gate array, an application-specific integrated circuit, a microprocessor, a micro-controller, or any other form of programmable hardware.

Figure 4:
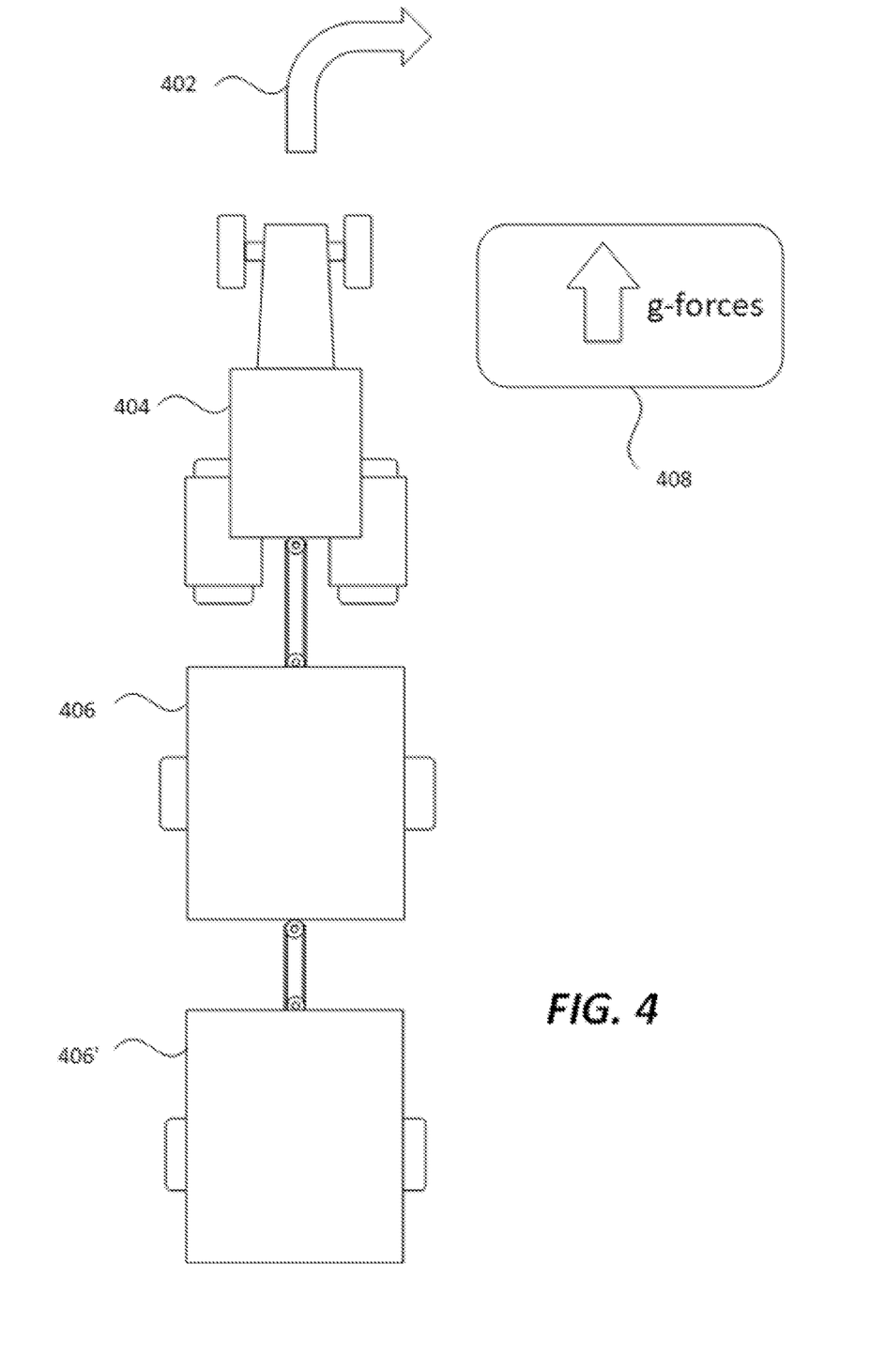
FIG. 4 is an illustration of a baggage tractor and baggage cart train going into a turn.

FIG. 4 depicts a view from above of a baggage tractor 404 connected to a number of baggage carts 406, 406'. The turning radius 402 is illustrated as a 90° turning angle, which results in the generation of g-forces 408 shown. The magnitude of the g-forces created will depend on the speed of the baggage tractor 404.

Figure 5:
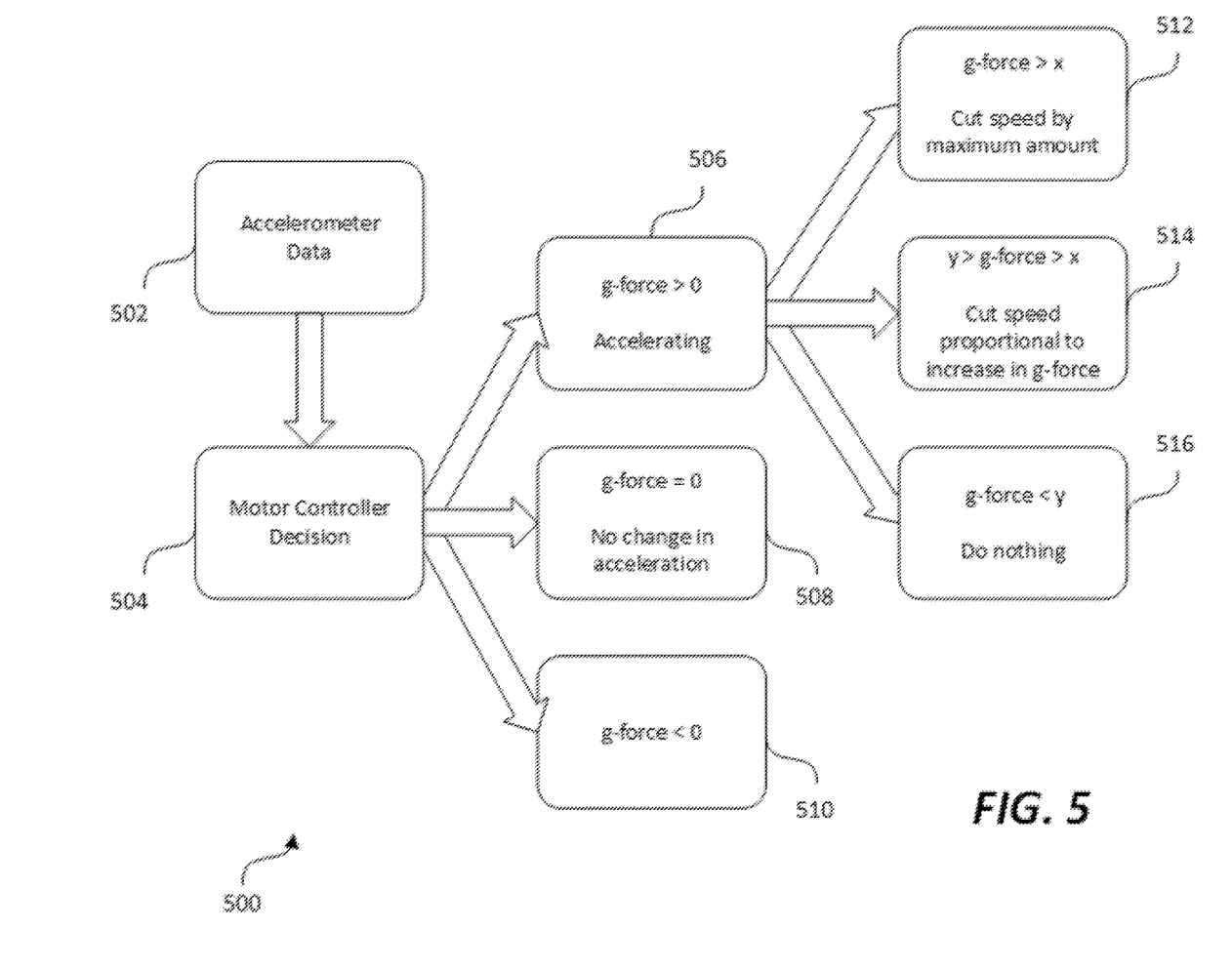
FIG. 5 is a diagram of a decision tree depicting the different decisions made by the motor controller of FIG. 3 based on input information.

Referring to FIG. 5, the decision-making process 500 of the motor controller 112 is illustrated in greater detail. As shown, accelerometer data 502 is transmitted from a peripheral device to the motor controller for decision 504 process. A negative value g-force 510 or a neutral or zero value g-force 508 will not result in an actionable decision by the safety system. A positive value g-force 506 indicates that an acceleration to a new direction is taking place. If a positive value g-force 506 is present, and the value of the g-force 516 is less than a manufacturer or installer (hereinafter "user") defined value y (e.g., a lower threshold value), the motor controller decision 504 process ends with no change to the power being transmitted to the motor. If a positive value g-force 506 is present, and the value of the g-force 514 is between a user defined value y and a user defined value x (e.g., between the lower threshold and an upper threshold), the system will cut the power transmitted to the motor to lower the speed of the baggage tractor in a manner that is proportional to the increase in g-force. It is contemplated that this proportionality may also defined and programmed by the user. If a positive value g-force 506 is present, but outside the user defined upper bound x (e.g., over the upper threshold), the system will cut the power transmitted to the motor by a maximum amount 512 to lower the speed of the baggage tractor.

Figure 6:
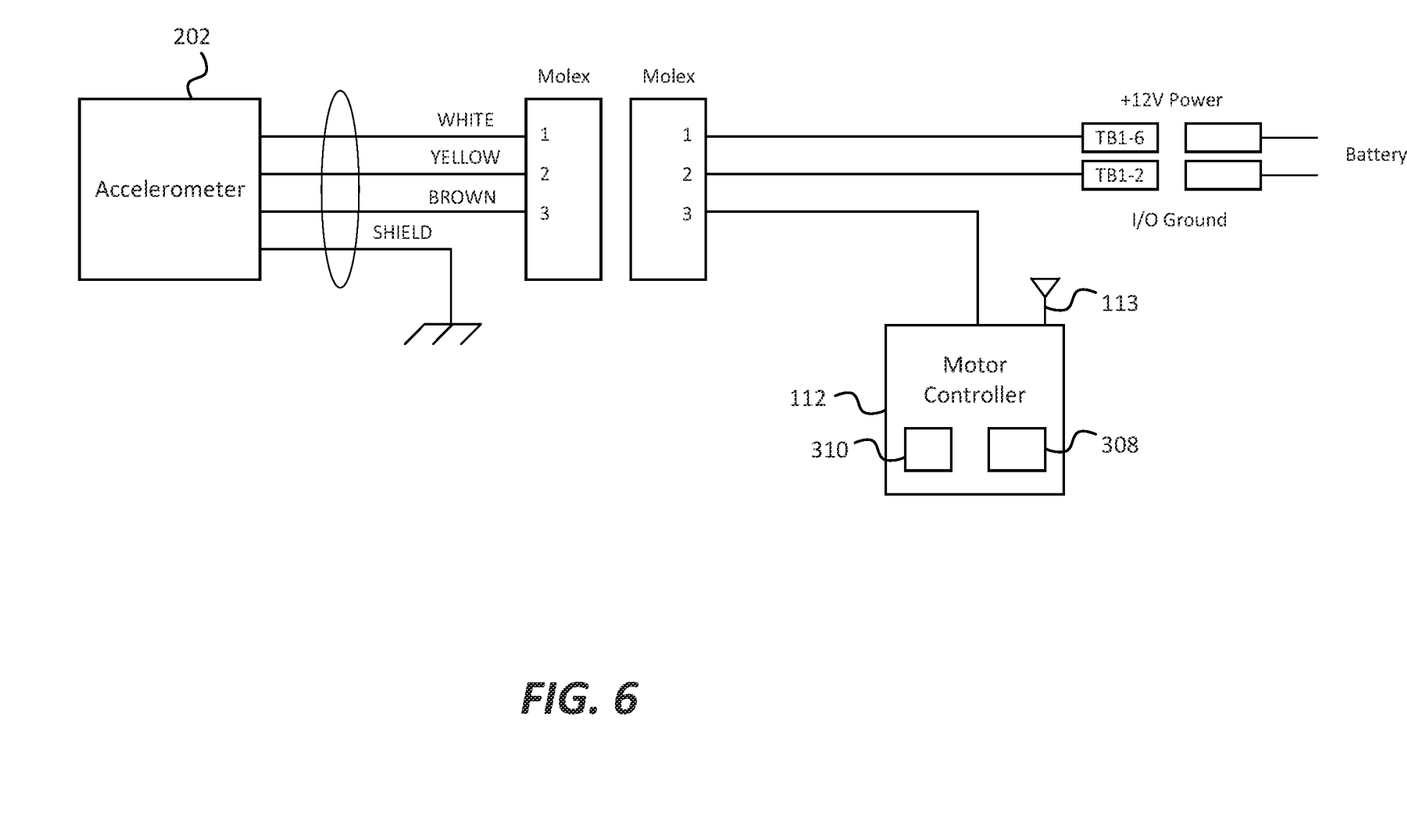
FIG. 6 is a schematic diagram for the g-force sensor, the motor controller, and the battery.

FIG. 6 includes a schematic diagram of the accelerometer, which may comprise Measurement Specialties™ MEAS 4030-002-120. Also shown in FIG. 6 is the motor controller, which may comprise Curtis™ 1238 Model 1238-7971. The accelerometer may further be provided integral with the motor controller.

As was discussed in connection with FIG. 3, a transceiver 113 may be provided to wirelessly couple to a remote computer (not shown) to receive information relating to the threshold values saved on the storage 310 for use by the processor 308. In this manner, the thresholds may be dynamically updated even while the baggage tractor is in use. Alternatively, the system may schedule updates to the thresholds based on a date or a human resources information, such as the season or that seasonal workers may be driving the baggage tractor. In any event, the system will be completely programmable or selectable such that the safety system can be adjusted to meet changing circumstances and conditions.

In one configuration of the system, the accelerometer 202 and the motor controller 112 may be provided as a retrofit assembly that is provided as a wiring harness as illustrated in FIG. 6. Likewise, a brake pedal and a throttle pedal may be provided on the wiring harness such that a combustion engine baggage tractor may be retrofit with an electric motor and wiring harness that is directly connectable to the electric motor and the battery.

Additionally, with respect to the accelerometer, while the Measurement Specialties MEAS 4030-002-120 can effectively be used in connection with the invention, it will be understood by those of skill in the art that various other types of accelerometers may used including, for example, but not limited to a piezoelectric accelerometer (physical stress produces voltage difference, usually from vibration or fast movement), a piezoresistance accelerometer (pressure applied to sensor increases resistance), a capacitive accelerometer (change in capacitance due to acceleration, allows minute measurement of changes in accel).

Although the invention has been described with reference to a particular arrangement of parts, features and the like, these are not intended to exhaust all possible arrangements or features, and indeed many other modifications and variations will be ascertainable to those of skill in the art.

What is claimed is:

1. A safety system for a baggage tractor having an electric motor connected to a battery for propelling the baggage tractor, the safety system comprising:
    a motor controller connected to the electric motor via a wiring harness;
    a g-force sensor associated with the motor controller and generating g-force data relating to a magnitude of a g-force generated by the movement of the baggage tractor, the data transmitted from said at least one sensor to said motor controller;
    a processor in said motor controller;
    a storage accessible by said processor, said storage having a first and a second g-force threshold value saved thereon, the first and second g-force thresholds defining a range;
    said processor receiving the g-force data generated by the g-force sensor and comparing the g-force data to the first g-force threshold value, wherein when the g-force data equals or exceeds the first g-force threshold value but does not exceed the second g-force threshold value, said processor causes said motor controller to automatically reduce power transmitted from the battery to the electric motor based on the received g-force data laying within the range to thereby cause a reduction in the speed of the baggage tractor, and
    wherein if the g-force data received exceeds the second g-force threshold value, the motor controller will reduce the power transmitted to the electric motor by a maximum selected or programmed amount.

2. The safety system according to claim 1, wherein said motor controller and said g-force sensor is provided as a retrofit assembly integrated with a wiring harness and adapted to be retrofit into an existing baggage tractor.

3. The safety system according to claim 2, wherein said wiring harness further comprises:
    a throttle pedal connected to said motor controller via the wiring harness; and
    a brake pedal connected to said motor controller via the wiring harness.

4. The safety system according to claim 1, wherein said g-force sensor comprises an accelerometer.

5. The safety system according to claim 1, wherein the first g-force threshold value is selectable or programmable.

6. The safety system according to claim 5, wherein both the first and second g-force threshold values are selectable or programmable.

7. The safety system according to claim 1, further comprising a steering angle sensor that generates steering angle data, a first steering angle threshold value is saved in said storage and when a magnitude of the steering angle data reaches or exceeds said first steering angle threshold value, said motor controller automatically reduces power transmitted from the battery to the electric motor.

8. The safety system according to claim 1, further comprising a speed sensor that generates speed data, a first speed threshold value is saved in said storage and when a magnitude of the speed data reaches or exceeds said first speed threshold value, said motor controller automatically reduces power transmitted from the battery to the electric motor.

9. The safety system according to claim 8, wherein the first speed threshold value comprises a range of values and the motor controller will reduce the power transmitted to the electric motor based on the value of the speed data within the range.

10. The safety system according to claim 1, further comprising,
a tilt sensor associated with the motor controller generating lateral tilt data for the baggage tractor;
said storage having a first tilt threshold value saved thereon;
said processor receiving tilt data generated by the tilt sensor and comparing the tilt data to the first tilt threshold value, wherein when a magnitude of the tilt data reaches or exceeds the first tilt threshold value, said processor causes said motor controller to automatically reduce power transmitted from the battery to the electric motor to thereby cause a reduction in the speed of the baggage tractor.

11. The safety system according to claim 10, wherein the first tilt threshold value comprises a range of values and the motor controller will reduce the power transmitted to the electric motor based on the value of the tilt data within the range.

12. The safety system according to claim 1, further comprising a transceiver connected to said processor, said transceiver receiving wireless signals from a remote computer to remotely adjust at least one of the first or second threshold values saved on said storage.

13. The safety system according to claim 12, wherein the at least one of the first or second threshold values are automatically adjusted based on programmed criteria selected from the group consisting of: a date, current local weather conditions, human resources information and combinations thereof.

14. A method of operating a baggage tractor having an electric motor connected to a battery for propelling the baggage tractor, the method comprising the steps of:
connecting a motor controller to the electric motor via a wiring harness;
connecting at least one sensor to a processor;
generating g-force data with a g-force sensor, the magnitude of the g-force data being related to a g-force acting on the g-force sensor due to the baggage tractor turning;
transmitting the g-force data from the at least one sensor to the processor;
providing a first and a second g-force threshold value stored in the storage, the first and second g-force thresholds defining a range,
comparing the g-force data to the first g-force threshold value saved on a storage and accessible by the processor;
wherein when the g-force data equals or exceeds the first g-force threshold value but does not exceed the second g-force threshold value, the motor controller automatically reduces power transmitted from the battery to the electric motor based on the received g-force data laying within the range to thereby cause a reduction in the speed of the baggage tractor; and
wherein if the g-force data received exceeds the second g-force threshold value, the motor controller will reduce the power transmitted to the electric motor by a maximum selected or programmed amount.

15. The method according to claim 14, further comprising the steps of:
selecting or programming the first g-force threshold value; and
saving the selected or programmed first g-force threshold value on the storage.

16. The method according to claim 15, wherein both the first and second g-force threshold values are selectable or programmable.

17. The method according to claim 14, further comprising the steps of: connecting a speed sensor to the processor;
generating speed data with the speed sensor;
transmitting the speed data to the processor;
saving a second threshold value on the storage;
comparing the speed data to the second threshold value;
automatically reducing power transmitted from the battery to the electric motor when the speed data reaches or exceeds the second threshold value.

18. The method according to claim 17, wherein the second threshold value comprises a range of values and the motor controller reduces the power transmitted to the electric motor based on the value of the speed data within the range.

19. The method according to claim 14, further comprising the steps of:
connecting a tilt sensor to the processor;
generating lateral tilt data with the tilt sensor;
transmitting the tilt data to the processor;
saving a third threshold value on the storage;
comparing the tilt data to the third threshold value;
automatically reducing power transmitted from the battery to the electric motor when the tilt data reaches or exceeds the third threshold value.

20. The method according to claim 19, wherein the third threshold value comprises a range of values and the motor controller reduces the power transmitted to the electric motor based on the value of the tilt data within the range.

21. The method according to claim 14, further comprising the steps of:
connecting the processor to a transceiver;
receiving wireless signals with the transceiver from a remote computer; and
adjusting at least one of the first or second threshold values saved on said storage.

22. The method according to claim 14, wherein the at least one of the first and second threshold values are automatically adjusted based on programmed criteria selected from the group consisting of: a date, current local weather conditions, human resources information and combinations thereof.

* * * * *